Patented May 11, 1937

2,080,138

UNITED STATES PATENT OFFICE 2,080,138

METHOD OF AGING WINE

Ernst T. Krebs, San Francisco, Calif.

No Drawing. Application August 10, 1936,
Serial No. 95,173

10 Claims. (Cl. 99—48)

This invention relates to a method of aging wine.

The main steps in the manufacture of wines are fermentation of crushed fruits to convert the sugars to alcohol; and allowing this to age in oak barrels from which the air is excluded.

The first step is completed within two months, more or less, but the aging process, which usually takes place in oak barrels, takes several years as the physical, chemical, and biological changes take place slowly and usually occur in a haphazard manner.

The changes that take place during aging, such as oxidation, aldehydation and esterification of the alcohols are the most essential, and these changes are principally brought about by the enzymes contained in the oak wood, together with the enzymes and yeasts of the crushed fruit.

One reason several years are required for aging is due to the small amount of enzymes present in the oak wood of the barrels in which aging takes place; and the great length of time it takes to bring the liquid contents of the barrel in direct contact with the deeper and unleached layers of the wood; for instance, in a fifty gallon barrel, there is only about ten square feet of surface presented to the liquid content, hence if this area could be doubled, trebled, and so on, the amount of enzymes present would be doubled, trebled, etc., providing the liquid content would remain the same and things being equal the aging would take place in a much shorter period of time.

In accordance with the method of the present invention, the aging of wines may be completed in a few months, said method employing practically the same physical, chemical and biological phenomena that occur in aging in oak barrels during a period of several years.

In arriving at the novel method of the present invention, a number of important discoveries have been made in connection with the aging of wines.

First, that enzymes of the emulsin group play an important factor in breaking down certain constituents of the oak by hydrolysis;

Second, that the growth of the cryptogamic spores of the oak which produce the amino compounds can be activated into growth and the growth materially facilitated by the action of the enzymes, and further accelerated by the addition of a solution of magnesium chloride and/or calcium chloride;

Third, that ground fresh acorns, particularly from the Quercus alba, activate the growth of the cryptogamic spores, which cryptogamic growth contains the all essential aminosuccinamide principle;

Fourth, that there is not a sufficient amount of enzymes present in the average oak barrel, or like container, to bring about the so-called aging of the wine in a short period of time, and for this reason enzymes, from other sources are added to more rapidly facilitate and expedite the so-called aging process and to more completely bring about these desired changes;

Fifth, that by adding treated oak wood to the wine to be aged in the form of shavings, or the like, the area of contact between wood and wine can be increased to almost any proportion desired;

Sixth, that the wine to be aged must be completely fermented and, in fact, carried beyond alcoholic fermentation until a certain amount of acetic acid has been formed, or acetic acid may be added to wine after alcoholic fermentation is completed, as the presence of this acid is necessary to promote the formation of acetyl esters.

The operation and process will be as follows:

In a room maintained at a moderately warm temperature, macerate comminuted white oak (chips, savings, sawdust, etc.) that has been toasted to a light golden brown color and some raw comminuted oak is placed in approximately a one percent solution of magnesium chloride and/or a solution of one tenth of one percent approximately of calcium chloride for about two hours, after which the solution is drained and discarded.

Now take approximately five grains of emulsin complex, particularly that derived from the kernel of the fruit of *Prunus armeniaca* (apricot) which is composed of the following enzymes, prunase, amygdalase, oxynitrilase, lactase and varying amounts of catalase and peroxidase. The five grains are dissolved in about four ounces (120 grams) of water, or sufficient of the mother solution from which these enzymes are derived. Mix this amount thoroughly with each gallon (3.78 liters) of the moist, toasted comminuted white oak wood. Mix this thoroughly twice a day in an open container in a moderately warm room. If the wood becomes too dry, enough water should be added from time to time to keep it quite moist. About the fourth or fifth day the same amount of emulsin, in solution, is again added, as previously, and thoroughly mixed with the moist toasted comminuted white oak wood in an open container and likewise stirred and kept for four to six days, and any residual liquid remaining is then drained off.

Now add to each gallon (3.78 liters) of the thoroughly drained treated toasted comminuted white oak wood about two ounces (60 grams) of white oak acorn meal and mix thoroughly and pack the slightly moist comminuted oak wood in a percolator or self draining vat and cover tightly and leave for about two to four days.

Now the new wine is added in which the alcoholic fermentation has been completed and a certain amount of acetic acid has formed, that is, at least enough to give the new wine a distinctly sour taste. If the total amount of wine to be treated is one hundred (100) gallons, it is added to approximately twenty (20) gallons of the treated comminuted oak wood which has been allowed to become partly dry, the proportion by measurement of the treated wood to wine being about one to five. After the wine has been added it is permitted to remain in contact with the wood for about twenty-four hours, after which it is drained off and after forty-eight hours, more or less, it is again poured back on the comminuted wood and left for another forty-eight hours. It is then again drained off and placed in a tight container in a warm place and after thirty to ninety days it is ready for bottling and consumption.

The first step in the treatment of the comminuted oak wood, to wit, that of saturating it with a solution of magnesium chloride and/or calcium chloride acts to accelerate the growth of the cryptogamic spores. The second step, which consists in adding the emulsin complex, plays an important factor as it causes breaking down of certain constituents of the oak wood by hydrolysis and it, furthermore, brings about rapid aging of the wine by very materially increasing the amount of enzymes present. The third step, to wit, that of adding the ground acorn meal is also important as the yeast content of the acorn meal facilitates the cryptogamic growth, the breaking down of the tannins, and furthers the process of oxidation. The method of treating the wine is also important as holding the new wine until it passes from the alcoholic slightly to the acetic stage of fermentation is essential, or addition of acetic acid must be made, as it is the acetic acid from which the acetyl esters are formed, these being necessary as they give both bouquet and flavor to the wine.

It should, however, be understood that other esters are formed during the process which give both bouquet and flavor, for instance, succinic acid is broken down from the amino-succinamide of the cryptogamic growth.

Wine treated according to the above process is completed usually in from three to four months' time, and it has the body, bouquet and taste equivalent to wine aged in barrels over a number of years.

While many features of the invention have been more or less specifically described, it is to be understood that variations in the mode of treatment may be resorted to and, similarly, where specific materials have been specified, others may obviously be substituted within the scope of the appended claims.

Having thus described my invention, what I claim and desire to secure by Letters Patent is:—

1. A method of aging wine which consists in holding new wine until it passes from the alcoholic slightly into the acetic stage of fermentation, moistening comminuted pulp obtained from white oak wood with a solution containing an emulsin complex, adding the pulp to the wine and then drawing off the wine and aging the wine in a closed container.

2. A method according to claim 1, which consists in moistening the comminuted pulp or wood with a solution containing an emulsin complex derived from the genus Prunus.

3. A method according to claim 1, which consists in adding the flour of fresh acorns, particularly from Quercus alba after the pulp has been treated with the solution of emulsin complex.

4. A method according to claim 1, which consists in moistening the pulp with a solution of magnesium chloride and calcium chloride prior to the addition of the emulsin complex.

5. A method of aging wine which consists in holding new wine until it passes from the alcoholic slightly into the acetic stage of fermentation, moistening comminuted pulp obtained from white oak wood with a solution of magnesium chloride and calcium chloride, adding a solution containing an emulsin complex, adding the pulp to the wine, and then drawing off the wine and aging the wine in a closed container.

6. A method of aging wine which consists in holding new wine until it passes from the alcoholic slightly into the acetic stage of fermentation, moistening comminuted pulp obtained from white oak wood with a solution of magnesium chloride and calcium chloride, adding a solution containing an emulsin complex, adding flour of fresh acorns, adding the pulp to the wine and then drawing off the wine and aging the wine in a closed container.

7. A method according to claim 1, which consists in moistening the pulp with a solution of magnesium chloride prior to the addition of the emulsin complex.

8. A method according to claim 1, which consists in moistening the pulp with a solution of calcium chloride prior to the addition of the emulsin complex.

9. A method of aging wine which consists in subjecting juice from which the wine is to be made to fermentation and holding the fermenting juice until alcoholic fermentation is substantially completed, adding acetic acid to the wine, moistening comminuted pulp obtained from white oak with a solution containing an emulsin complex, adding the pulp to the wine and then drawing off the wine and aging the wine in a closed container.

10. A method of aging wine which consists in subjecting juice from which the wine is to be made to fermentation and holding the fermenting juice until alcoholic fermentation is substantially completed, adding acetic acid to the wine, moistening comminuted pulp obtained from white oak with a solution of magnesium chloride and calcium chloride, adding a solution containing an emulsin complex, adding flour of fresh acorns, adding the wine to the pulp, and then drawing off the wine and aging the wine in a closed container.

ERNST T. KREBS.